United States Patent [19]

Hopkins

[11] Patent Number: 5,416,843

[45] Date of Patent: May 16, 1995

[54] DEVICES, SYSTEMS AND METHODS FOR COMPOSITE SIGNAL DECODING

[75] Inventor: Harland G. Hopkins, Missouri City, Tex.

[73] Assignee: Texas Instruments Incorporated, Dallas, Tex.

[21] Appl. No.: 938,114

[22] Filed: Aug. 31, 1992

[51] Int. Cl.⁶ ............................................. H04H 5/00
[52] U.S. Cl. ...................................................... 381/7
[58] Field of Search ..................... 381/3, 7, 4; 331/20, 331/25; 375/111

[56] References Cited

U.S. PATENT DOCUMENTS

| | | | |
|---|---|---|---|
| 4,630,299 | 12/1986 | Welles, II et al. | 381/4 |
| 4,723,288 | 2/1988 | Borth et al. | |
| 4,847,864 | 7/1989 | Cupo | 375/14 |
| 5,239,585 | 8/1993 | Restle | 381/7 |

OTHER PUBLICATIONS

Stremler, Ferrel G., *Intro. to Communication Systems*, Addison-Wesley Pub., 1990, p. 693.
Widrow, et al, "Adaptive Noise Cancelling: Principles and Applications", Proceedings of the IEEE, vol. 63, No. 12, Dec. 1975.
Press, Wm., *Numerical Recipes: The Art of Scientific Computing*, Cambridge Press, 1986.

*Primary Examiner*—Forester W. Isen
*Attorney, Agent, or Firm*—C. Alan McClure; James C. Kesterson; Richard L. Donaldson

[57] ABSTRACT

A device and method for composite signal decoding is provided in which an analog to digital converter (18) digitizes an incoming composite signal. The digitized signal is transmitted to a least mean squares estimator (24). Least mean squares estimator (24) generates composite estimates which are filtered in filter (26). A phase extractor (28) extracts information on the phase between the sampling frequency and the incoming composite signal. Any phase shift existing between a left channel and right channel of the incoming composite signal are compensated in phase compensator (30). A channel extractor (34) extracts a sum and a difference of the left and right channels based on the phase information generated by phase extractor (28). An interpolator (36) adds and subtracts the information generated by channel extractor (34) to isolate the left and right channel signals.

9 Claims, 1 Drawing Sheet

DEVICES, SYSTEMS AND METHODS FOR COMPOSITE SIGNAL DECODING

NOTICE (C) Copyright, Texas Intruments Incorporated, 1992. A portion of the Disclosure of this patent document contains material which is subject to copyright protection. The copyright owner has no objection to facsimile reproduction by anyone of the patent document or the patent disclosure, as it appears in the U.S. Patent and Trademark Office, patent file or records, but otherwise reserves all rights in its copyright whatsoever.

TECHNICAL FIELD OF THE INVENTION

This invention generally relates to devices, systems and methods for decoding a composite signal.

BACKGROUND OF THE INVENTION

Without limiting the scope of the invention its background is described in connection with a scheme for decoding a composite frequency modulation (FM) stereo signals, as an example.

A composite FM stereo signal is of the form:

$$fm(t) = [l(t) + r(t)] + A_p \sin(\omega_p t) + [l(t) - r(t)][\sin(2\omega_p t)] \quad (1)$$

where:
fm(t) is the time varying value of the composite signal;
l(t) is the time varying value of the left channel signal;
r(t) is the time varying value of the right channel signal;
$A_p$ is the amplitude of the 19 Khz pilot signal;
$\omega_p$ is the pilot frequency of $2\Pi*$, 19K radians per second (19 Khz).

FIG. 1 illustrates a frequency spectrum of a typical FM stereo composite signal showing the components of Equation 1. The components include a sum of the left and right channel signals covering a 15 Khz bandwidth from DC to 15 KHz and the difference of the left and right channels modulated to and centered about a 38 Khz suppressed stereo subcarrier signal, with upper and lower sidebands spanning a 30 KHz bandwidth. Additionally the composite signal fm(t) signal includes a 19 KHz tone signal, commonly referred to as the pilot signal which is used as a reference signal for the radio receiver. The composite signal may also contain subsidiary signals in the 53 Khz to 75 KHz bandwidth, such as a subsidiary communication authorization (SCA) signal. These signals are excluded from FIG. 1 for clarity.

The composite signal fm(t) must be separated into left and right channels ("decoded") in order to reproduce the broadcast message in stereo. This requires extracting from the composite signal the values of the left channel and the right channel signals, l(t) and r(t) respectively of Equation 1 in isolation from the other components of the composite signal.

One analog method of decoding involves first passing the composite stereo through a low pass filter to remove the subsidiary signals, such as the SCA signal, leaving only the basic stereo signal. The basic stereo signal is then mixed with the 38 KHz subcarrier with one resulting component being one sideband of the (L−R) signal translated down to baseband. The premixing basic stereo signal and the stereo signal mixed with the stereo subcarrier are in parallel passed through a low pass filter and then to a summing circuit and a subtracting circuit, the summing circuit adding the two signals together and the subtracting circuit subtracting the mixed signal from the unaltered basic stereo signal. One of the resulting components from the summation is 2l(t) (i.e. twice the time varying value of the left channel component). As a result of the subtraction, one of the resulting components is 2r(t) (i.e. twice the time varying value of the right channel component). The right and left channel information is then easily extracted by filtering out the remaining components resulting from the mixing, summation and subtraction operations. This analog approach is well known in the art and is susceptible to all of the disadvantages inherent with analog signal processing such, problems with noise, drift with temperature, and overall circuit complexity.

One digital decoding approach which overcomes the disadvantages inherent with analog decoding circuitry involves converting from the analog to the digital domain the composite FM stereo signal output from the FM discriminator. In this instance, the 38 Khz modulated portions of composite signal are sampled at selected points when the term [$\sin 2\omega_p$] (or alternatively $\sin \omega_{sc}$, where $\omega_{sc}$ is the angular frequency of the subcarrier, typically 38 KHz) in Equation 1 is equal to plus or minus one (the ninety degree points on the stereo subcarrier) such that the composite signal is equal to either twice the left channel (2l) or twice the right channel (2r). The left and right channel information can then be easily extracted. The substantial difficulty with this approach is that, if the samples vary from the ninety degree points on the subcarrier, the sine of the subcarrier signal will not equal plus or minus one and a given sample will not represent a signal which is essentially purely right channel information or purely left channel information; the result is a deterioration in channel separation. One means of overcoming this problem is to use a voltage controlled oscillator feedback path to phase lock the sampling frequency to the pilot signal frequency. The 19 KHz pilot signal is then used to determine when sampling of the 38 KHz modulated information will occur. This method however requires substantially complex and costly hardware to implement.

Thus, the need has arisen for improved devices, systems and methods for decoding composite signals. Such devices, systems and methods would overcome the substantial technical disadvantages inherent with currently available analog decoding means and the substantial cost and complexity disadvantages inherent with currently available digital decoding means.

SUMMARY OF THE INVENTION

In accordance with the teachings of the present invention, an FM stereo decoder is provided which substantially eliminates or reduces disadvantages or problems associated with prior art decoders. In particular, a decoder is provided in which an analog to digital converter samples an incoming FM stereo composite signal having a pilot signal, a carrier signal, and left and right channel signals. A pilot signal amplitude estimator generates component estimates of the amplitude of the pilot signal. These component estimates are used to generate information on the phase shift existing between the analog to digital converter's sampling frequency and the pilot and carrier signals. This phase information is used by a channel extractor to extract a sum and a difference of the left and right channel signals. An interpolator then is used to isolate the left and right channel signals.

An important technical advantage of the present invention is the fact that expensive phase locked loop circuitry and associated oscillators are not required to decode the left and right stereo channel signals.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

Figure 1:
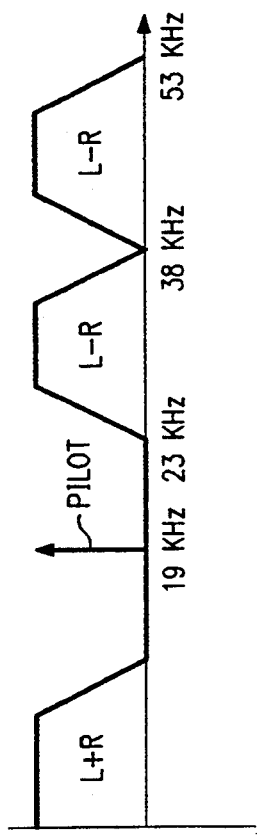
FIG. 1 is a frequency spectrum representative of a typical FM stereo composite signal.
Figure 2:
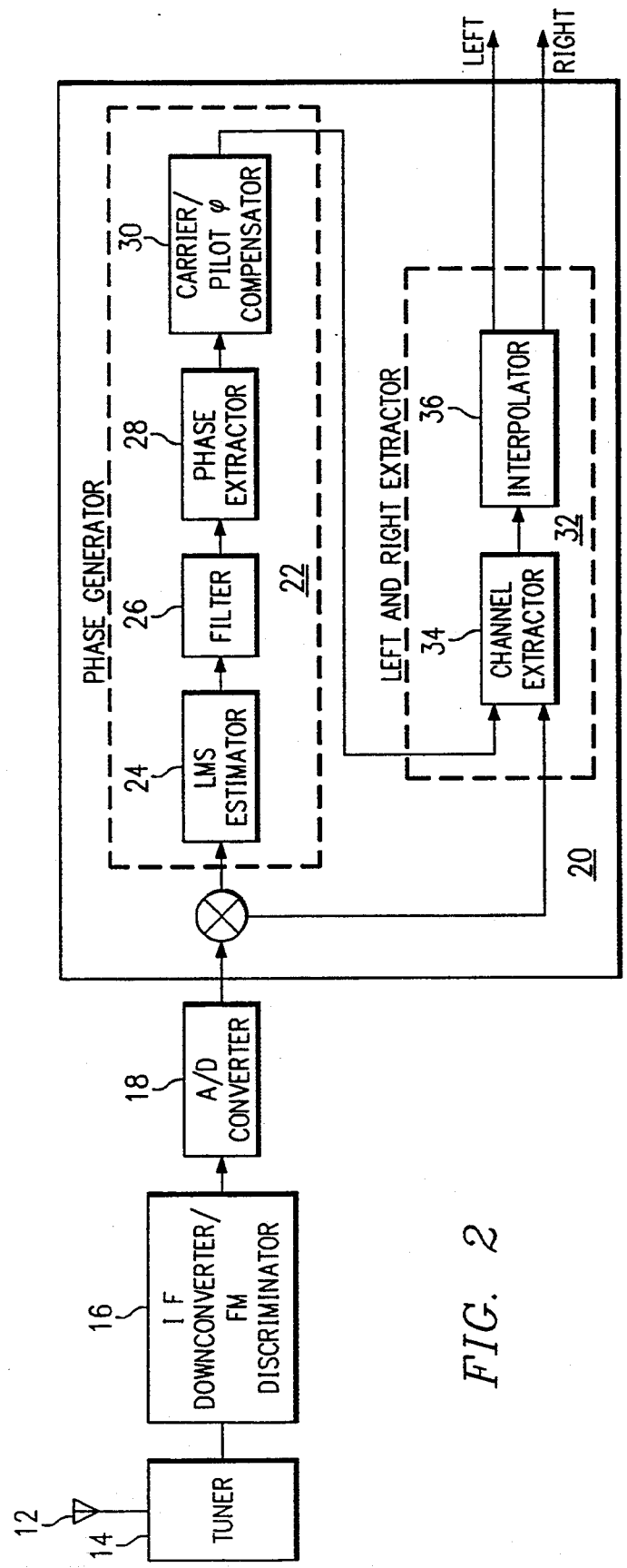
FIG. 2 is a block diagram of a stereophonic radio system according to the present invention.

FIG. 2 is a block diagram of a stereo radio receiving system 10 constructed according to the teachings of the present invention. Stereo receiver 10 includes antenna 12 for receiving radio frequency broadcasts carrying the composite FM signal to be decoded. A tuner 14 is coupled to antenna 12 and is operable to select a frequency band of the desired station while rejecting all other frequencies. An intermediate frequency (IF) downconverter/FM discriminator 16 is coupled to tuner 14. As is known in the art, downconverter/discriminator 16 down-converts the frequency of the selected band from the radio frequency (RF) to an intermediate frequency band. Downconverter/discriminator 16 then extracts the encoded signal with a spectrum as shown in FIG. 1 by stripping away the carrier.

In the illustrated embodiment, the encoded stereo signal is transmitted from downconverter/discriminator 16 to an analog-to-digital converter 18. Analog-to-digial converter 18 samples the encoded stereo signal of FIG. 1 at a sampling frequency of 152 KHz. At this selected sampling frequency, the left and right channel information is sampled four times for each signal period, since the information is modulated at 38 KHz. The pilot signal, transmitted at 19 KHz, is sampled eight times each signal period. It should be understood that a higher sampling rate may be used without departing from the intended scope of the present invention. For purposes of the following discussion, a sampling rate of 152 KHz will be used.

The digitized composite signal is transmitted from A/D converter 18 to decoder 20 for decoding of the composite FM signal and extracting of the left and right channel information. Decoder 20 may be, for example, a Texas Instruments TMS-320 family digital signal processor available from Texas Instruments Incorporated.

The preferred embodiment of the present invention is realized in the method of programming a digital signal processor embodying decoder 20, and therefore the subblocks within decoder 20 of FIG. 2 depict functions implemented in software. In alternate embodiments, these functions may be realized in whole or in part by equivalent hardware.

Ideally, samples taken by A/D converter 18 would be in phase with the pilot and carrier signals. In the usual case, however, a phase shift will exist between the sampling frequency and the carrier and pilot signals. Thus, it is necessary to determine this phase shift to accurately decode the left and right channels from the composite signal. Accordingly, within decoder 20, the phase shift is determined and then used to extract the left and right channel information.

The digitized samples generated by A/D converter 18 are transmitted to decoder 20. Within decoder 20, the digitized signals generated by A/D converter 18 are first processed by a phase generator and then by a left and right extractor. Within the phase generator, shown generally at 22, the digitized signals are transmitted to pilot signal amplitude, PSA estimator 24. PSA estimator 24 generates the components of an estimate of the amplitude of the pilot signal. These estimates are transmitted to filter 26 and filtered to remove information unrelated to the pilot signal.

The information filtered by filter 26 is transmitted to phase extractor 28. Phase extractor 28, through the use of trigonometric functions, extracts the phase shift that exists between the pilot and carrier signals and the sampling frequency.

Ideally, the carrier frequency is twice that of the pilot frequency, and the pilot and carrier signals are in phase. Thus, ideally, the phase between the sampling frequency and the pilot signal will be half of the phase shift between the carrier-signal and the sampling frequency. However, there may be a phase shift between the pilot and carrier signals. Thus, carrier/pilot phase compensator 30 is coupled to phase extractor 28 to compensate for this phase shift between carrier and pilot signals.

In operation, phase generator 22 operates to generate the phase angle existing between the sampling frequency and the pilot and carrier signals. To accomplish this, PSA estimator 24 first generates the components of the pilot signal amplitude estimates of the amplitude of the pilot signal. It can be assumed that the pilot signal is of the form $$\text{Pilot} = a \sin(\omega_p t) + b \cos(\omega_p t), \quad (2)$$

wherein a and b are constants, $\omega_p$ is the pilot frequency in radians per second, and t is time. For the least mean squares estimate of the pilot signal, $$P_{est}^2 = a_{est}^2 + b_{est}^2, \quad (3)$$

where $P_{est}$ is the estimate of the amplitude of the pilot signal, and $a_{est}$ and $b_{est}$ are the estimates of the components of $P_{est}$.

It can be shown that the least mean squares estimate of $a_{est}$ and $b_{est}$ are $$a_{est} = \sum_{k=0}^{7} Fm(k)\sin\left(k \times \frac{\pi}{4}\right) \quad (4)$$

$$b_{est} = \sum_{k=0}^{7} Fm(k)\cos\left(k \times \frac{\pi}{4}\right), \quad (5)$$

where $Fm(k)$ are the samples taken by A/D converter 18 over time. The factor of $\pi/4$ used in equations 4 and 5 above is included since the sampling rate is eight times the pilot frequency, i.e., $$8\frac{\pi}{4}$$

equals $\pi/4$. Thus, for higher sampling rates, different factors should be used to calculate $a_{est}$ and $b_{est}$. Furthermore, the following is true:

$$a_{est} = P_{est}\cos\left(\frac{\phi}{2}\right) \quad (6)$$

$$b_{est} = P_{est}\sin\left(\frac{\phi}{2}\right), \quad (7)$$

where $\phi$ is equal to the phase shift between the sampling frequency and the carrier signal. Thus $\phi/2$ is equal to the phase shift between the sampling frequency and the pilot signal.

By using Equations 4 and 5 above, a least mean squares estimate of the components of the pilot signal can be generated. To ensure the accuracy of these estimates, filter 26 is used to filter out non-pilot signal information, such as high frequency artifacts. Low pass filter 26 may be a digital filter, and may filter $a_{est}$ and $b_{est}$ according to the following equations:

$$a_{filt}[n] = f_1 a_{filt}[n-1] + f_2 a_{est} \quad (8)$$

$$b_{filt}[n] = f_1 b_{filt}[n-1] + f_2 b_{est} \quad (9)$$

where $a_{filt}$ and $b_{filt}$ are the filtered representations of $a_{est}$ and $b_{est}$, and $f_1$ and $f_2$ are filter factors. In a particular embodiment, $f_1$ may be equal to 3,277 and $f_2$ may be equal to 29,491, although other values may be used without departing from the intended scope of the present invention and where it should be recognized that the equations are normalized with a value equaling the sum of $F_1 + F_2$. As will be noted from Equations 8 and 9, $a_{filt}$ and $b_{filt}$ are generated every eight samples, and are functions of the previously calculated $a_{filt}$ and $b_{filt}$.

As discussed above, there may exist a phase shift between the carrier and pilot signals. This phase shift may be compensated for in carrier/pilot phase compensator 30. This phase compensation is accomplished by multiplying the sin and cos of the phase shift of the carrier signal by a constant. In a particular embodiment, this constant equals 25,723.

Phase extractor 28 extracts the phase shift between the sampling frequency and the carrier and pilot signals through the use of trigonometric functions. Through the use of Equations 3, 6, and 7 above, substituting $a_{filt}$ and $b_{filt}$ for $a_{est}$ and $b_{est}$, and through the use of trigonometric identities, it can be shown that:

$$\cos(\phi) = \frac{(a_{filt}^2 - b_{filt}^2)}{(a_{filt}^2 + b_{filt}^2)} \quad (10)$$

$$\sin(\phi) = \frac{2a_{filt}b_{filt}}{(a_{filt}^2 + b_{filt}^2)}. \quad (11)$$

The FM composite signal samples generated by A/D converter 18, along with the sin and cos of the phase angle generated by phase generator 22, are input into left and right channel extractor 32. Left and right channel extractor 32 includes channel extractor 34 coupled to interpolator 36. The output of interpolator are the decoded left and right FM channel signals.

In operation, channel extractor 34 extracts the sum of the left and right channels and the difference of the left and right channels. It can be shown that the difference and sum of the left and right channels, $(1-r)$ and $(1+r)$, are represented by the following equations:

$$l - r = Fm(0)\sin\phi + Fm(1)\cos\phi - Fm(2)\sin\phi - Fm(3)\cos\phi + Fm(4)\sin\phi + Fm(5)\cos\phi - Fm(6)\sin\phi - Fm(7)\cos\phi \quad (12)$$

$$l + r = \sum_{k=0}^{7} Fm(k) \quad (13)$$

Thus, after every eighth sample, $(l-r)$ and $(l+r)$ are generated by channel extractor 34.

The individual left and right channels are generated by interpolator 36. Interpolator 36 receives the sum and difference channel information from channel extractor 34 to generate the individual left and right channel information.

In particular, interpolator generates eight estimates for each channel for every eight samples generated by A/D converter 18. These data values may be represented as L(0), L(1) ... L(8), and R(0), R(1) ... R(8). L(8) and R(8) represent the most current left and right channel estimates, respectively. L(0) and R(0) represent the last estimate of the left and right channels, and are thus equal to the previously calculated L(8) and R(8) respectively.

L(8) is calculated by adding the terms $1+r$ and $1-r$ generated by channel extractor 34, and then dividing by two. L(4) is generated by adding L(8) to the last left channel estimate, L(0), and dividing by two. To calculate L(1), L(2), L(3), L(5), L(6), and L(7), an interpolation factor is added to the preceding estimate. The interpolation factor, $a_{lest}$, is equal to $$\frac{L(8) - L(0)}{8}.$$

Thus, $L(1) = L(0) + a_{lest}$. Likewise, $L(2) = L(1) + a_{lest}$, $L(3) = L(2) + a_{lest}$, $L(5) = L(4) + a_{lest}$, $L(6) = L(5) + a_{lest}$, $L(7) = L(6) + a_{lest}$.

The right channel is isolated by first generating R(8) by subtracting the term $1-r$ from the term $1+r$ generated by channel extractor 34, and divided by two. R(4) is equal to $$\frac{R(0) + R(8)}{2}.$$

The interpolation factor for the right channel, $a_{lest}$ is equal to $$\frac{R(8) + R(0)}{8}.$$

Furthermore,
$R(1) = R(0) + a_{lest}$, $R(2) = R(1) + a_{lest}$,
$R(3) = R(2) + a_{lest}$, $R(5) = R(4) + a_{lest}$,
$R(6) = R(5) + a_{lest}$, $R(7) = R(6) + a_{lest}$, In summary, a digital FM stereo decoder is provided in which a composite FM stereo signal is digitized and decoded. To decode the digitized composite signal, the phase angle between the sampling frequency and the carrier and pilot signals is calculated. This phase information is then used with the original sampled data to extract the left and right signals using the phase lo information and an interpolator.

Although the present invention has been described in detail, it should be understood be understood that various changes, substitutions and alterations can be made without departing from the spirit and scope of the invention as defined solely by the appended claims.

What is claimed is:

1. A method of decoding a composite FM stereo signal having a pilot signal, a carrier signal, and left and right channel signals, comprising the steps of:

digitizing the FM stereo signal out of phase with the pilot and carrier signals;

generating component estimates of the amplitude of the pilot signal using pilot signal amplitude estimates according to the formulas, $$a_{est} = \sum_{k=0}^{i} Fm(k)\sin\left(k \times \frac{2\pi}{i+1}\right),$$

$$b_{est} = \sum_{k=0}^{i} Fm(k)\cos\left([K]k \times \frac{2\pi}{i+1}\right),$$

where i is one less than the number of samples generated by the analog to digital converter each period of the pilot signal, $a_{est}$ and $b_{est}$ are the component estimates, and Fm(k) are the digitized samples for each cycle of the pilot signal;

generating phase information based on the component estimates by generating a sine and a cosine of the phase between the carrier signal and the digital sampling according to the formulas, $$\cos\phi = \frac{(a_{filt}^2 - b_{filt}^2)}{(a_{filt}^2 + b_{filt}^2)},$$

$$\sin(\phi) = \frac{2a_{filt}b_{filt}}{(a_{filt}^2 + b_{filt}^2)},$$

where $a_{filt}$ and $b_{filt}$ are derived from $a_{est}$ and $b_{est}$, respectively;

extracting a sum and a difference of the left and right channel signals by extracting the difference of the left and right channels according to the formula, $l-r=F_m(0) \sin \phi+Fm(1) \cos \phi-Fm(2) \sin \phi-Fm(3) \cos \phi+Fm(4) \sin \phi+Fm(5) \cos \phi-Fm(6) \sin \phi-Fm(7) \cos \phi$, and extracting the sum of the left and right channels according to the formula, $$l + r = \sum_{k=0}^{7} Fm(k)2$$

where $\phi$ is the phase angle; and
isolating the left and right channel signals.

2. The method of claim 1, and further comprising the step of compensating for phase shifts between the pilot and carrier signals.

3. The method of claim 1, wherein said step of isolating comprises isolating the left and right channel signals by adding and subtracting the sum and difference of the left and right channel signals.

4. The method of claim 1, and further comprising the step of filtering the component estimates to eliminate non-pilot signal artifacts.

5. An FM stereo decoder for decoding a composite FM stereo signal having a pilot signal, a carrier signal, and left and right channel signals, comprising:

an analog to digital converter for digitizing said FM stereo signal out of phase with said pilot and carrier signals;

a pilot signal amplitude estimator coupled to said analog to digital converter for generating component estimates of the amplitude of said pilot signal, wherein said pilot signal amplitude estimator generates said component estimates according to the formulas, $$a_{est} = \sum_{k=0}^{i} Fm(k)\sin\left(k \times \frac{2\pi}{i+1}\right),$$

$$b_{est} = \sum_{k=0}^{i} Fm(k)\cos\left([K]k \times \frac{2\pi}{i+1}\right),$$

where i is one less than the number of samples generated by said analog to digital converter each period of said pilot signal, $a_{est}$ and $b_{est}$ are said components estimates, and Fm(k) are the digitized samples generated by said analog to digital converter each cycle of said pilot signal;

a phase estimator coupled to said pilot signal amplitude estimator for generating phase information based on said component estimates, wherein said phase estimator generates a sine and a cosine of the phase between said carrier signal and said analog to digital sampling according to the formulas, $$\cos\phi = \frac{(a_{filt}^2 - b_{filt}^2)}{(a_{filt}^2 + b_{filt}^2)},$$

$$\sin(\phi) = \frac{2a_{filt}b_{filt}}{(a_{filt}^2 + b_{filt}^2)},$$

where $a_{filt}$ and $b_{filt}$ are derived from $a_{est}$ and $b_{est}$, respectively;

a channel extractor coupled to said phase estimator for extracting a sum and a difference of said left and right channel signals, wherein said channel extractor extracts said difference of said left and right channels according to the formula, $l-r=F_m(0) \sin \phi+Fm(1) \cos \phi-Fm(2) \sin \phi-Fm(3) \cos \phi+Fm(4) \sin \phi+Fm(5) \cos \phi-Fm(6) \sin \phi-Fm(7) \cos \phi$, and said sum of said left and right channels according to the formula, $$l + r = \sum_{k=0}^{7} Fm(k)2$$

where $\phi$ is the phase angle; and
an interpolator coupled to said channel extractor for isolating said left and right channel signals.

6. The decoder of claim 5, and further comprising a filter coupled between said least mean squares estimator and said phase estimator operable to filter said component estimates to eliminate non-pilot signal artifacts.

7. The decoder of claim 5, and further comprising a phase compensator coupled between said phase estimator and said channel extractor, said phase compensator operable to compensate for phase shifts between said pilot and carrier signals.

8. The decoder of claim 5, wherein said least mean squares estimator, said phase estimator, said channel extractor and said interpolator comprise a digital signal processor.

9. The decoder of claim 5, wherein said interpolator generates said left and right channel signal by adding and subtracting said sum and difference of said left and right channels.

* * * * *